United States Patent
Turner et al.

(10) Patent No.: US 10,627,001 B2
(45) Date of Patent: Apr. 21, 2020

(54) CHECK VALVE SYSTEM

(71) Applicant: Sulzer Mixpac AG, Haag (CH)

(72) Inventors: Hayden Turner, Ayer, MA (US); Garrett Faino, Durham, NH (US)

(73) Assignee: SULZER MIXPAC AG, Haag (CH)

( * ) Notice: Subject to any disclaimer, the term of this patent is extended or adjusted under 35 U.S.C. 154(b) by 0 days.

(21) Appl. No.: 16/023,701

(22) Filed: Jun. 29, 2018

(65) Prior Publication Data
US 2020/0003315 A1    Jan. 2, 2020

(51) Int. Cl.
F16K 15/00 (2006.01)
B05C 11/10 (2006.01)
B05C 17/005 (2006.01)

(52) U.S. Cl.
CPC .......... *F16K 15/00* (2013.01); *B05C 11/1028* (2013.01); *B05C 17/00566* (2013.01)

(58) Field of Classification Search
CPC ....... B05B 7/04; B05B 7/0408; B05B 7/0416; B05B 7/045; B05C 11/1028; B05C 11/1036; B05C 11/1044; B05C 17/00553; B05C 17/00566; F16K 15/044; F16K 15/063; F16K 15/12; F16K 15/025
USPC ...... 137/896; 239/407, 413, 417.5; 222/135, 222/136, 145.1, 145.5, 145.6, 496
See application file for complete search history.

(56) References Cited

U.S. PATENT DOCUMENTS

| | | | |
|---|---|---|---|
| 2,459,048 A | 1/1949 | Schwartz et al. | |
| 2,658,714 A | 12/1953 | Fooshee | |
| 2,912,001 A | 11/1959 | Green | |
| 3,248,021 A | 4/1966 | Corsette et al. | |
| 3,690,557 A | 9/1972 | Higgins | |
| 3,779,464 A | 12/1973 | Malone | |
| 3,790,030 A | 2/1974 | Ives | |
| 3,850,194 A * | 11/1974 | Brown | E21B 21/10 137/496 |

(Continued)

FOREIGN PATENT DOCUMENTS

| CN | 202946017 U | 5/2013 |
|---|---|---|
| CN | 106308640 A | 1/2017 |

(Continued)

OTHER PUBLICATIONS

International Search Report and Written Opinion dated Sep. 18, 2019 in corresponding International Patent Application No. PCT/EP2019/067226, filed Jun. 27, 2019.

*Primary Examiner* — Kevin F Murphy
*Assistant Examiner* — Jonathan J Waddy
(74) *Attorney, Agent, or Firm* — Global IP Counselors, LLP

(57) ABSTRACT

A check valve system includes a housing, a blocking element, and a biasing member. The housing has a passageway therethrough, the passageway including a first portion and a second portion, the first portion having a diameter that is less than a diameter of the second portion so as to form a stepped portion. The blocking element is disposed within the second portion of the passageway. The biasing member is disposed within the second portion of the passageway and configured to maintain the blocking element in contact with the stepped portion when under compression. The housing, the blocking element and the biasing member being obtainable by substantially simultaneously 3D printing, so as to be formed from one or more 3D printable materials.

16 Claims, 11 Drawing Sheets

(56) References Cited

U.S. PATENT DOCUMENTS

| | | | | |
|---|---|---|---|---|
| 3,856,043 | A | * | 12/1974 | Feild ............ F04B 49/24 137/508 |
| 4,088,298 | A | * | 5/1978 | Brown ............ F16K 15/183 137/68.16 |
| 4,117,551 | A | | 9/1978 | Brooks et al. |
| 4,121,736 | A | | 10/1978 | McGaw, Jr. |
| 4,366,837 | A | * | 1/1983 | Roettgen ............ F16K 17/0413 116/268 |
| 5,004,125 | A | | 4/1991 | Standlick |
| 5,092,492 | A | | 3/1992 | Centea |
| 5,332,157 | A | | 7/1994 | Proctor |
| 5,439,141 | A | | 8/1995 | Clark et al. |
| 5,520,522 | A | | 5/1996 | Rathore et al. |
| 5,600,076 | A | | 2/1997 | Fleming et al. |
| 5,788,126 | A | | 8/1998 | Chang |
| 5,911,343 | A | | 6/1999 | Keller |
| 6,000,764 | A | | 12/1999 | Dokas |
| 6,161,729 | A | * | 12/2000 | Gentile ............ B65D 47/2031 222/129 |
| 6,183,075 | B1 | | 2/2001 | Sasaki |
| 6,299,023 | B1 | | 10/2001 | Arnone |
| 6,375,096 | B1 | * | 4/2002 | Rashidi ............ B01F 13/002 239/413 |
| 6,752,782 | B2 | | 6/2004 | Liao |
| 6,978,800 | B2 | * | 12/2005 | deCler ............ F16K 15/026 137/538 |
| 8,038,040 | B2 | * | 10/2011 | Dennis ............ B05B 11/0037 222/464.1 |
| 2003/0196703 | A1 | | 10/2003 | Decler et al. |
| 2013/0118101 | A1 | | 5/2013 | Mitchell |
| 2013/0199636 | A1 | * | 8/2013 | Doh ............ F16K 15/044 137/539 |
| 2013/0250714 | A1 | | 9/2013 | Harboe et al. |
| 2016/0228899 | A1 | | 8/2016 | Gonzalez et al. |
| 2016/0288158 | A1 | | 10/2016 | Hiemer |
| 2019/0022346 | A1 | * | 1/2019 | Ishikita ............ A61M 16/209 |
| 2019/0128308 | A1 | * | 5/2019 | Martin ............ F16B 5/0664 |

FOREIGN PATENT DOCUMENTS

| | | | |
|---|---|---|---|
| DE | 200 09 766 U1 | 10/2001 | |
| EP | 0 297 259 A2 | 1/1989 | |
| EP | 0 607 102 A1 | 7/1994 | |
| EP | 0 787 535 A1 | 8/1997 | |
| EP | 1 806 184 A2 | 7/2007 | |
| EP | 2 781 253 A1 | 9/2014 | |
| WO | 01/00521 A1 | 1/2001 | |
| WO | 2005/087616 A1 | 9/2005 | |
| WO | 2013/035119 A1 | 3/2013 | |
| WO | 2014/146967 A1 | 9/2014 | |
| WO | WO-2017115866 A1 * | 7/2017 | ......... A61M 16/209 |

* cited by examiner

CHECK VALVE SYSTEM

BACKGROUND

Field of the Invention

The present invention generally relates to a check valve system. In particular, the present invention relates to a check valve system in which the housing, the blocking element and the biasing member are 3D printed.

Background Information

Conventional check valve devices are known. Conventional check valve devices can include a passage with an inlet opening and an outlet opening. A check valve is arranged in the passage and is configured in such a way that the passage can be closed by the check valve. Moreover, some check valves can be used with a dispensing device. In these check valves, the inlet opening in the check valve can align with the opening in another device, such as a storage device, and the outlet opening in the check valve can align with the dispensing device. The passage in the check valve can convey a component from the storage device to the dispensing device when the check valve is in an open position.

SUMMARY

It has been found that conventional check valve devices are formed using multiple molds. One object of the present disclosure is to provide a check valve system that is efficiently formed and provide a method capable of efficiently forming the check valve system.

In view of the state of the known technology, one aspect of the present disclosure is to provide a check valve system, comprising a housing, a blocking element, and a biasing member. The housing has a passageway therethrough, the passageway including a first portion and a second portion, the first portion having a diameter that is less than a diameter of the second portion so as to form a stepped portion. The blocking element is disposed within the second portion of the passageway. The biasing member is disposed within the second portion of the passageway and is configured to maintain the blocking element in contact with the stepped portion when under compression. The housing, the blocking element and the biasing member being obtainable by substantially simultaneously 3D printing, so as to be formed from one or more 3D printable materials.

In view of the state of the known technology, another aspect of the present disclosure is to provide a method of forming a check valve system, the method comprising substantially simultaneously 3D printing a housing having a passageway therethrough, the passageway including a first portion and a second portion, the first portion having a diameter that is less than a diameter of the second portion so as to form a stepped portion, a blocking element disposed within the second portion of the passageway, and a biasing member disposed within the second portion of the passageway and configured to maintain the blocking element in contact with the stepped portion when under compression.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
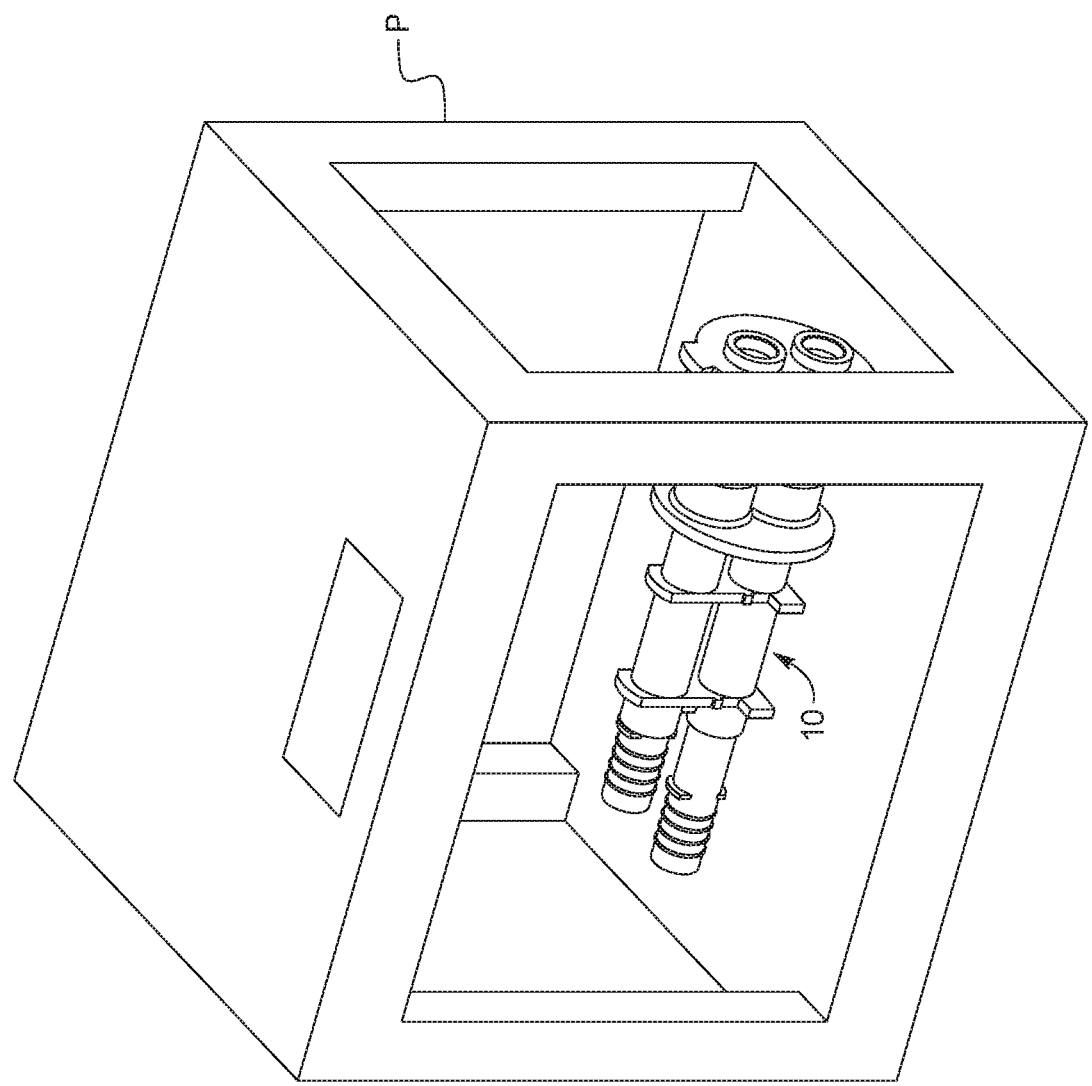
FIG. 1 is a front perspective view of a 3D printer printing a check valve system according to an embodiment of the present invention.
Figure 2:
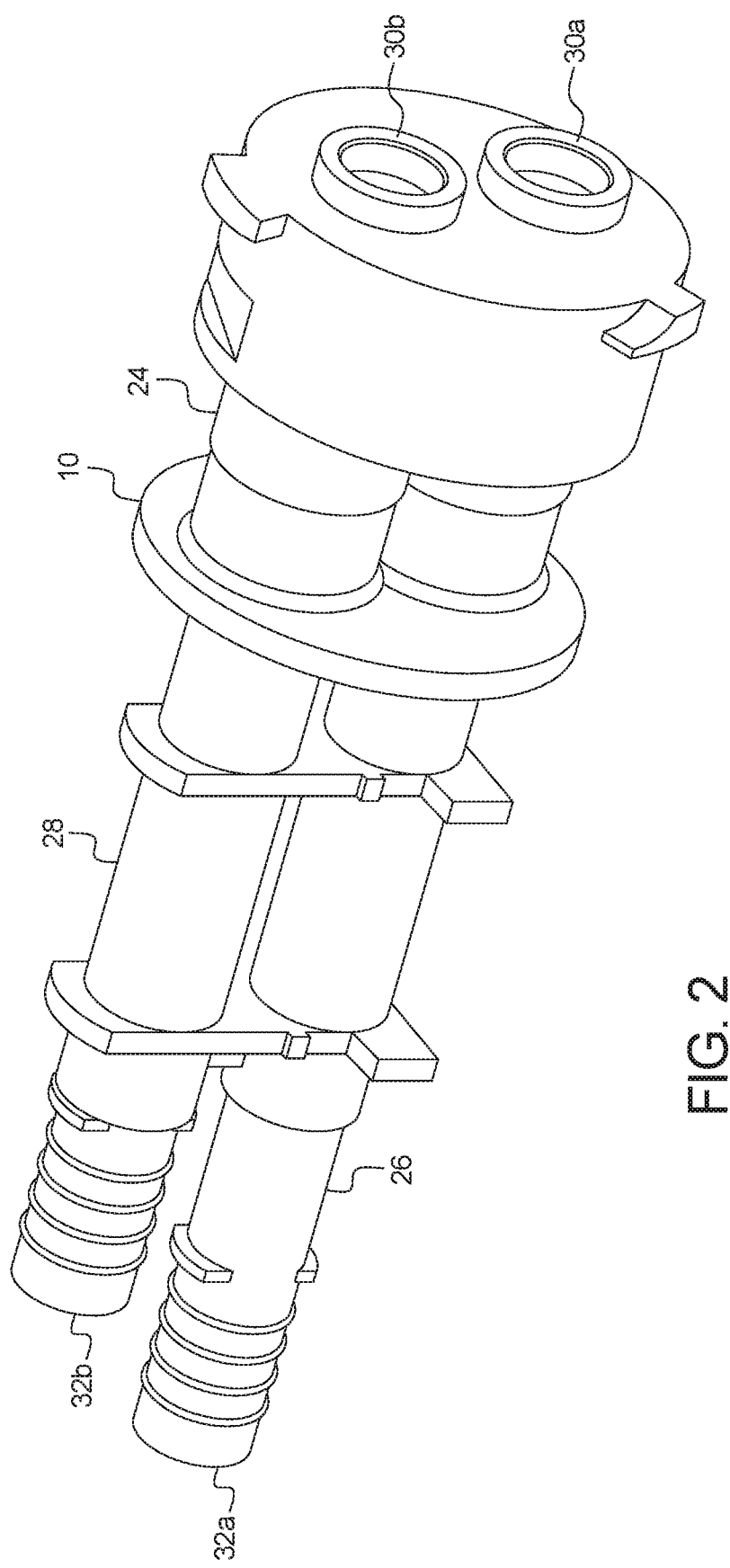
FIG. 2 is a perspective view of a completed 3D printed check valve system according to an embodiment of the present invention.

Referring initially to FIGS. 1 and 2, a check valve system 10 according to an embodiment of the present invention is shown. FIG. 1 illustrates the check valve system 10 being printed by a 3D printer P. FIG. 2 illustrates the check valve system 10 after completion of 3D printing.

Figure 3:
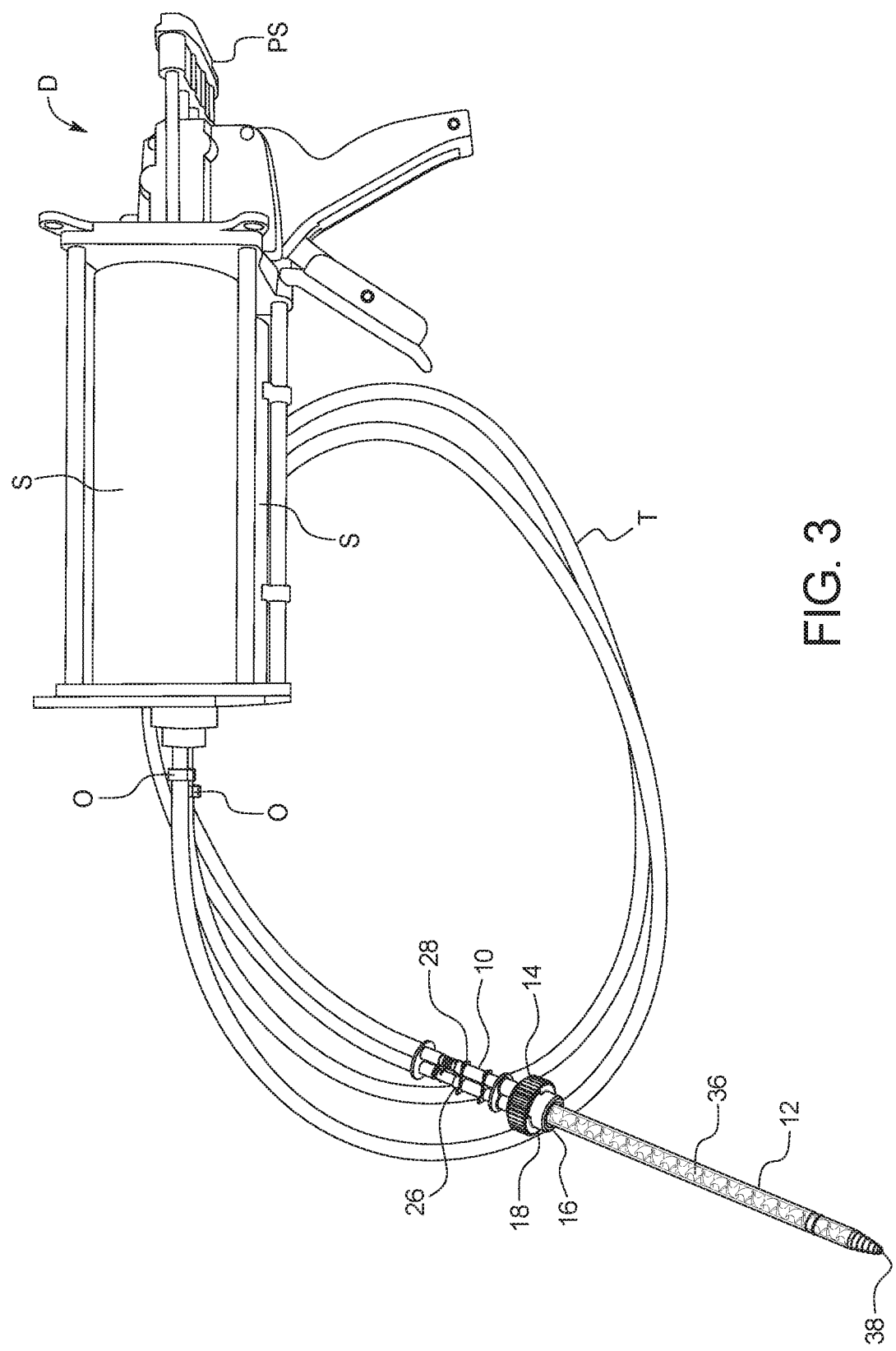
FIG. 3 is a perspective view of the check valve system of FIG. 2 connected to a mixer and a dispenser.

As shown in FIG. 3, the check valve system 10 is a valve system that is configured to couple to a mixer 12 and to a dispenser (dispensing device) D for the mixing and dispensing of at least two components. The dispenser D can be any dispenser and generally includes a plunger system PS. Cartridges or storage devices S for storing the compounds can be positioned within the dispenser D. The mixer 12 can be in fluid communication with the storage devices S using tubes T (or in any suitable manner) and securely coupled to the check valve system 10 using a locking member 14. The locking member 14 is generally a cylindrical device with an opening 16 in a first end 18 for the mixer 12 and an opening 20 in the second end 22 for the check valve system 10. As can be understood, the locking member 14 can couple the check valve system 10 to the mixer 12 in any suitable manner. For example, the locking member 14 can couple to the check valve system 10 using threads, a snap fit or any removable or nonremovable system desired. The locking member 14 then clamps the mixer within the opening 16. It is noted that the locking member 14 can lock the mixer 12 in any manner desired.

Generally, the check valve system 10 can be an intermediate device or element disposed between a storage device S that contains two separate materials to be mixed and the mixer 12. However, it is noted that the check valve system 10 can simply be a check valve between a storage device S for one material and a dispenser D or the check valve system 10 can be implemented in a single device that dispenses one or more materials. Any discussion of the multiple materials and the mixing of the materials, multiple passages and the connection to any devices is merely a depiction of one embodiment.

As shown in FIGS. 3-7, the check valve system 10 includes a housing 24 having a first passageway 26 for conveying a first component from the storage device S to the mixer 12 and a second passageway 28 for conveying a second component from the storage device S to the mixer 12. The first passageway 26 and the second passageway 28 are configured to be separate from one another such that the first component and the second component can be guided separately. In accordance with the invention blocking elements 29, 31 are arranged in the first and the second passageways 26, 28, respectively, and are configured to close the first and second passageway 26, 28.

Each of the first and second passageway 26, 28 includes an inlet (first inlet 30a/second inlet 30b) and an outlet (first outlet 32a/second outlet 32b for a material or fluid. The inlets 30a/30b are configured to couple to the storage device S that contains first and second compounds. Preferably, the compounds are stored in the storage device S so as to be separate and not mixed. As can be understood, the inlets 30a/30b of the first and second passageways 26, 28 of the check valve system 10 are configured to align with outlet openings O in the storage device S. Thus, when desired, one compound from the storage device S can enter the first inlet 30a of the first passageway 26 of the check valve system 10 and another compound from the storage device S can enter the second inlet 30b of the second passageway 28 of the check valve system 10.

The outlets 32a/32b of the first and second passageways 26 and 28 are configured to couple to the mixer 12. As can be understood, the outlets 32a/32b of the first and second passageways 26, 28 of the check valve system 10 are configured to align with inlet openings 34 in the mixer 12. Preferably, as the compounds move through the check valve system 10 they are not mixed. The compounds are preferably mixed after exiting the check valve system 10 and entering the mixer 12, where the compounds are mixed by the mixing elements 36 and then dispensed as a mixed compound through the outlet 38 of the mixer 12.

Each of the first and second passageways 26, 28 includes a first portion 40a/40b and a second portion 42a/42b. Each of the first and second portions 40a/40b of the passageways 26, 28 is generally cylindrical and defines a predetermined length in the dispensing direction. The inlets 30a/30b of the first and second passageways 26, 28 are disposed at openings 44a/44b in the first portions 40a/40b and the outlets 32a/32b for each of the first and second passageways 26, 28 are disposed at openings 48a/48b in the second portion 42a/42b.

The first portion 40a/40b of each of the first and second passageways 26, 28 has a diameter that is less than a diameter of the second portion 42a/42b so as to form stepped portions 50a/50b. The step portions 50a/50b are preferably ledges or abutments defining shelves or ledges 52a/52b that extend radially inwardly and traverse (or substantially perpendicular) relative to the dispensing or longitudinal direction L.

Figure 7:
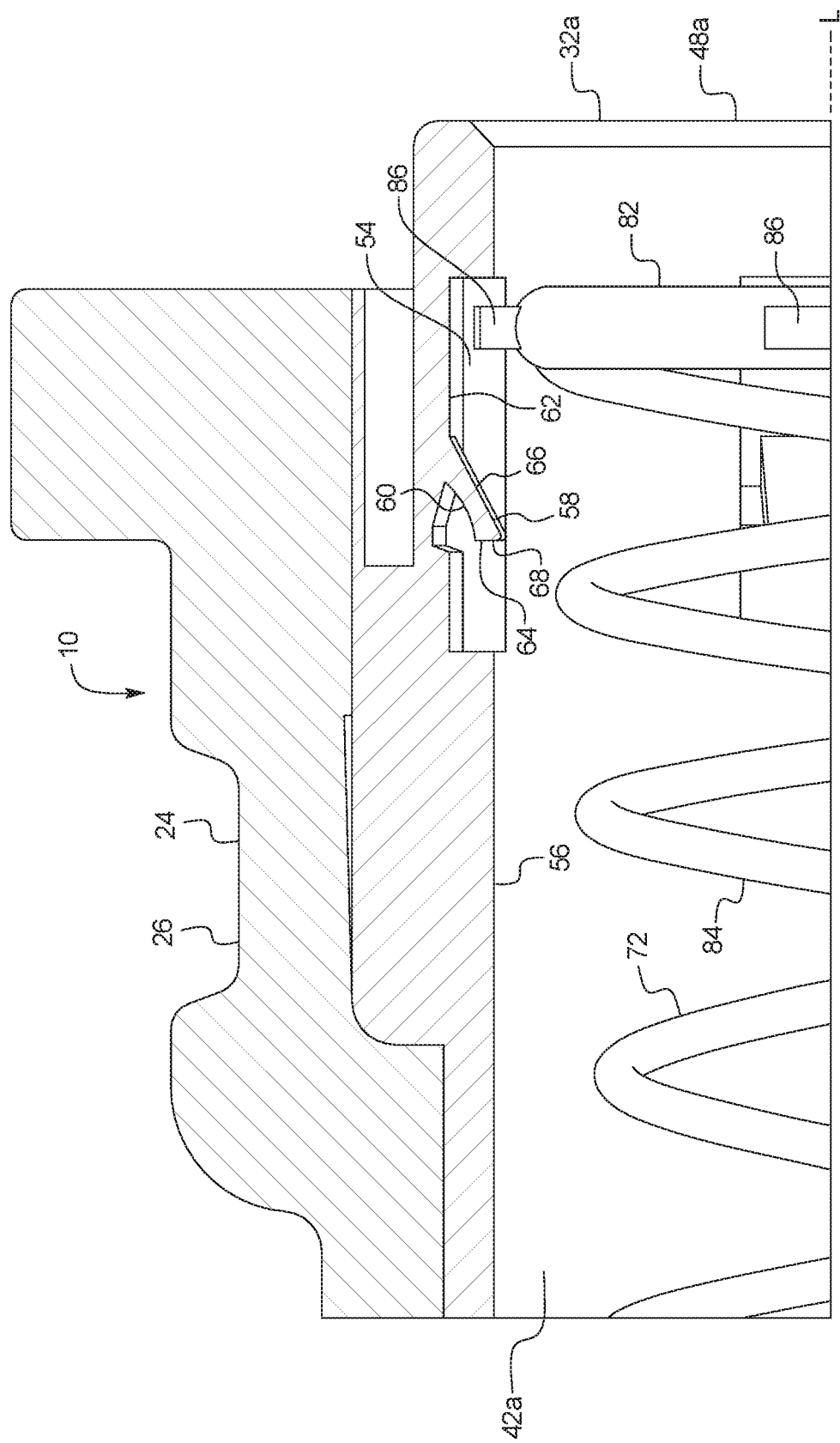
FIG. 7 is an enlarged cross sectional partial view of one passageway of the check valve system of FIG. 2.

In this embodiment, only the first passageway 26 will be discussed; however, it is noted that any description of the first passageway 26 can be applied to the second passageway 28. As shown in FIG. 7, the second portion 42a, adjacent the outlet 48a includes a circumferential groove 54. That is, a groove 54 is disposed within the inner wall 56 that defines the second portion 42a of the passageway 26. The groove 54 includes a protrusion (retention clip) 58 that extends radially inwardly. In one embodiment, the protrusion 58 is angled relative the longitudinal direction L. The protrusion 58 has a proximal end 60 attached to the wall 62 of the groove 54 and a distal end 64 disposed away from the wall 62 of the groove 54. An angled surface 66 between the proximal end 60 and the distal end 64 slants inwardly in a direction opposite the longitudinal direction L. The distal end 64 includes a surface 68 that is preferably transverse or generally perpendicular to the longitudinal direction L. It is noted that the groove 54 is merely one embodiment, and the protrusion 58 can be disposed in any manner desired. For example, the protrusion 58 can be disposed directly on the wall 56 (and not within a groove) or in any suitable manner.

Each of the second portions 42a/42b of each of the first and second passageways 26, 28 includes blocking elements 29 and 31 respectively and biasing members or springs 72 and 73. Each of the blocking elements 29 and 31 are preferably generally circular and include an arcuate surface 74 and a flat surface 76 opposite the arcuate surface 74. The arcuate surface 74 meets the flat surface 76 at the peripheral edge 78 of each of the blocking elements 29 and 31 to form a domed shape. Each of the blocking elements 29 and 31 preferably have a diameter that is larger than the diameter of the respective first portion 40a/40b of the first and second passageways 26, 28 but less than the diameter of the respective second portion 42a/42b of the first and second passageways 26, 28. Thus, the arcuate surfaces 74 of the blocking elements 29 and 31 can engage the ledges 52a/52b and separate the first portions 40a/40b of the first and second passageways 26, 28 from the second portions 42a/42b of the first and second passageways 26, 28. Thus, when the arcuate surfaces 74 of the blocking elements 29 and 31 engage the ledges 52a/52b, the check valve system 10 is in a closed position or state, and when the arcuate surfaces 74 of the blocking elements 29 and 31 disengage the ledges 52a/52b, or is disposed away from the ledges 52a/52b, the check valve system 10 is in an open position or state. It is noted that this configuration of the blocking elements 29 and 31 are merely exemplary, and the blocking elements 29 and 31 can be any suitable configuration that would enable the first and second passageways 26, 28 to be closed.

The biasing members 72 and 73 are disposed within the second portion 42a/42b of the first and second passageways 26, 28. Thus, the biasing members 72 and 73 preferably have a diameter that is less than the diameter of the second portions 42a/42b of the first and second passageways 26, 28. In one embodiment, the biasing members 72 and 73 are springs, but the biasing members 72 and 73 can be any suitable biasing member capable of biasing the blocking elements 29 and 31 along a respective passageway 26, 28.

Figure 5:
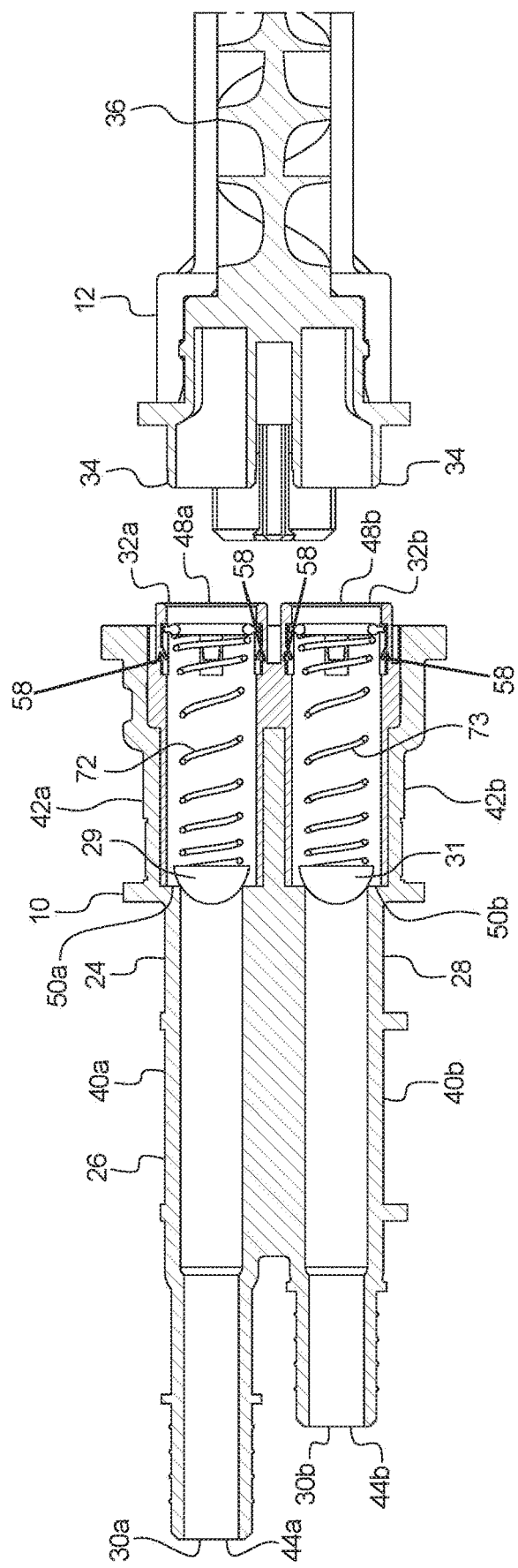
FIG. 5 is a cross sectional view of the check valve system of FIG. 2 prior to connection with the mixer.
Figure 6:
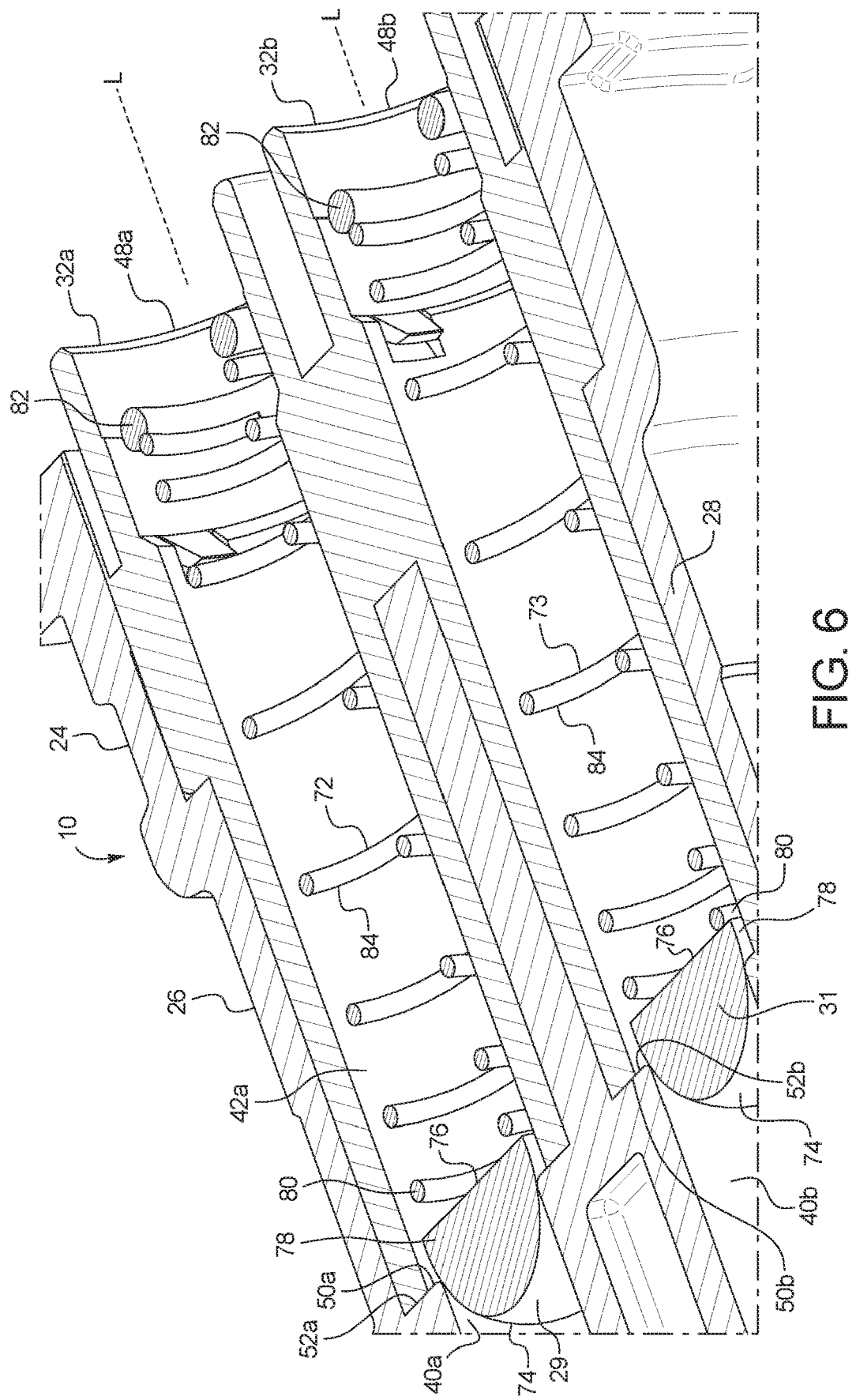
FIG. 6 is a cross sectional perspective view of the check valve system of FIG. 2 prior to connection with the mixer.

As can be seen in FIG. 5, each of the biasing members 72 and 73 in this embodiment is a coil spring. It is noted that biasing member 72 will be discussed, but any description thereof is applicable to biasing member 73. The biasing member 72 includes a first end 80, a second end 82 and a plurality of coils 84 disposed therebetween. As can be understood, when the ends 80, 82 of the biasing member 72 are relatively compressed, the coils 84 store energy that causes a force to be applied toward the ends 80, 82 of the biasing member 72. Preferably, the first end 80 of the biasing member 72 is a flat portion of the biasing member 72 that is configured to abut the flat surface 76 of the blocking elements 29 and 31. In one embodiment, the first end 80 of the biasing member 72 is generally flush against the flat surface 76 of the blocking elements 29 and 31.

The second end 82 of the biasing member 72 is a flat portion of the biasing member 72 that is configured to abut the mixer 12. Additionally, as shown in FIGS. 5-9, the flat portion at the second end 82 of the biasing member 72 has a plurality of protrusions 86. In one embodiment, the flat portion at the second end 82 of the biasing member 72 has four protrusions 86 that extend radially outwardly beyond the diameter of the biasing member 72. The biasing member 72 extends so as to extend beyond the diameter of the wall 56 of the second portion 42a and thus be configured to enter the groove 54. The protrusions 86 can be disposed at 90° intervals around the second end 82 of the biasing member 72 and enter the groove 54 in four predetermined spaced areas. However, is it noted that there can be any number of protrusions 86 disposed in any arrangement desired. Further the protrusion 86 can be a single protrusion that encompasses all or any part of the second end 82 of the biasing member 72.

Further, it will be understood that the groove 54 and protrusion 86 can be any number and configuration that would enable one or more protrusions to enter one of more grooves.

As described herein, the check valve system 10 can be 3D printed using a 3D printer P. 3D printing refers to a process in which material is joined or solidified under computer control to create a three-dimensional object, with material being complied to form the desired object. In some embodiment, a computer can refer to a smart phone, a tablet, a printer motherboard, a processor computer in the printer, or any other device with a processor or an electronic, controller. The material for each element of the check valve system (e.g., the housing 24, the blocking elements 29 and 31 and the biasing members 72 and 73) can be any material, such as liquid molecules or powder grains being fused together. In some embodiments, the check valve system 10 can be printed from one or more materials such as PA12, polypropylene, and/or glass filled polyamide. However, the material can be any suitable material or materials. In one embodiment, the 3D printer P substantially simultaneously prints all of the components (e.g., the housing 24, the blocking elements 29 and 31 and the biasing members 72 and 73) out of the same materials. In this regard substantially simultaneously printed means that the elements of the check valve system are printed in a single printing process. Accordingly, for example during the printing process the 3D printer may be, at a specific time, printing the one element (e.g., housing 24) and not another element (e.g., blocking elements 29 and 31 and/or biasing members 72 and 73), since the 3D printing of all the element occurs during the same printing process, the each of the elements is considered to be substantially simultaneously printed by the 3D printer. However, it is noted that each of the components (e.g., the housing 24, the blocking elements 29 and 31 and the biasing members 72 and 73) can be simultaneously printed from different materials or printed from different materials or the same materials at different times using the same or different 3D printers. Thus, as can be understood, in one embodiment the housing 24, the blocking elements 29 and 31 and the biasing members 72 and 73 can be formed from one or more 3D printable materials using the same or different 3D printers. One of ordinary skill would be able to determine that the components were 3D printed (rather than injection molded, for example) based on the surface finish of the component. Moreover, it would be apparent to one of ordinary skill if a device were to be formed from multiple parts and then assembled.

The check valve system 10 is printed such that the biasing members 72 and 73 are under zero stress. As can be understood, springs (or biasing members) have an inherent stress range with that lies between minimum and maximum loads. When a spring is not subject to any force or stress it is at the minimum end of that spectrum, i.e., when the spring is not deflected, the spring is under zero stress. Moreover, when you twist, compress, or pull a spring, the spring will tend to return to the 'minimum' stress position (i.e., zero stress).

Figure 4:
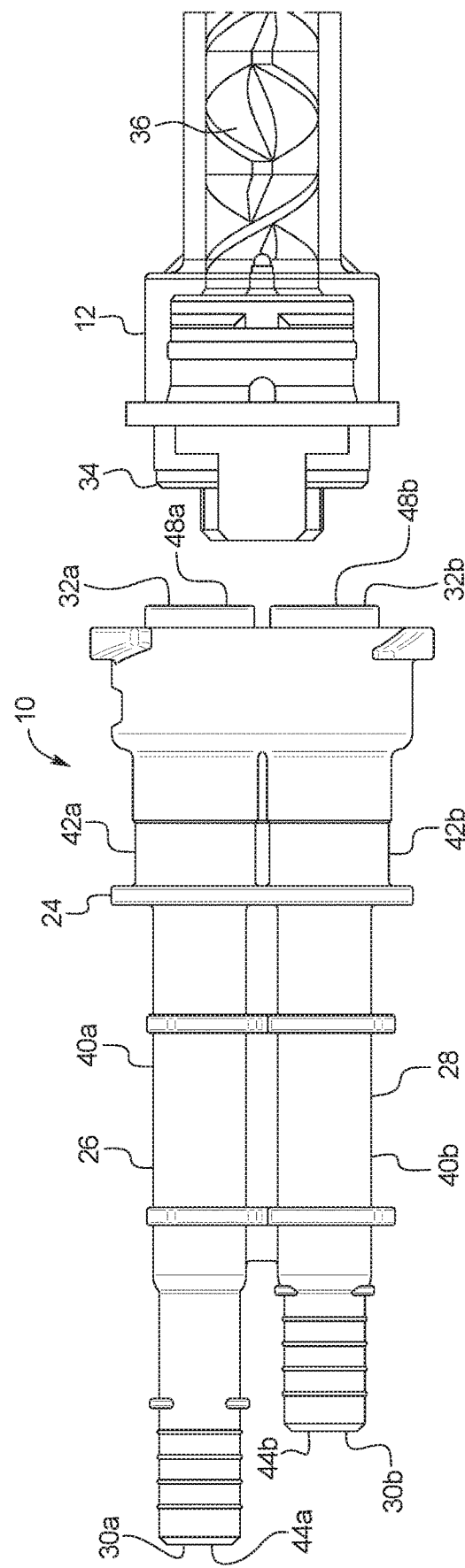
FIG. 4 illustrates the check valve system of FIG. 2 prior to connection with the mixer.

Thus, in this embodiment, the biasing members 72 and 73 are not compressed and thus are not storing any energy. Once the check valve system 10 has been printed, the mixer 12 can be attached. As shown in FIGS. 4 and 5, the outlets 32a/32b for the first and second passageways 26, 28 are aligned with the respective openings 34 in the mixer 12. The mixer 12 is moved toward the check valve system 10 and the mixer 12 openings 34 are inserted into the outlets 32a/32b for the first and second passageways 26, 28.

Figure 8:
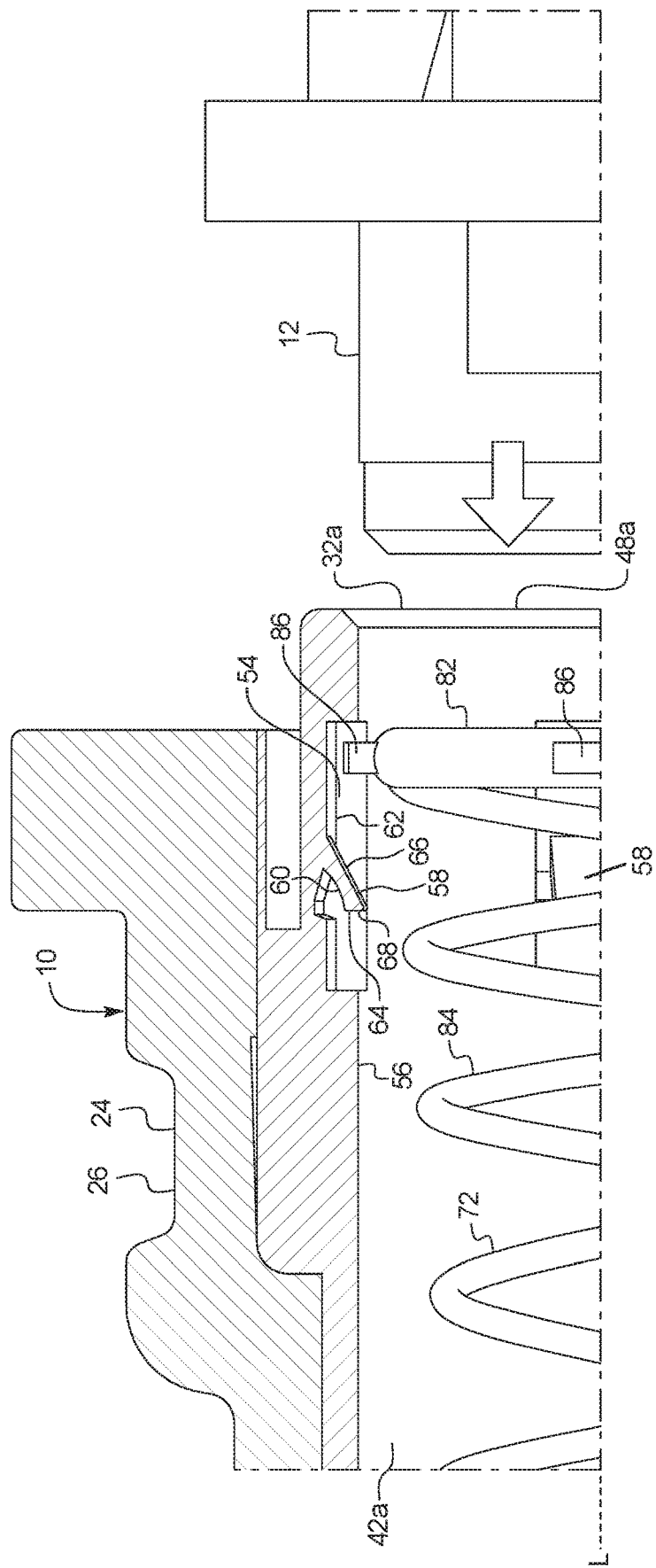
FIG. 8 is an enlarged cross sectional partial view of one passageway of the check valve system of FIG. 2 prior to attachment with the mixer.

As shown in FIG. 8, the end of the mixer 12 biases the biasing member 72 away from the opening 44a/44b, compressing the biasing member 72. Thus, as the mixer 12 is connected to the check valve system 10 the biasing member 72 is initially compressed when the mixer 12 is at least partially disposed in the second portion 42a of the first passageway 26. That is, the biasing member 72 is compressed for the first time, when the mixer 12 is connected to the check valve system 10. This configuration enables the biasing member 72 to maintain a zero stress or compression state when not in use. Thus, the usable life of the biasing member 72 can be increased.

Figure 9:
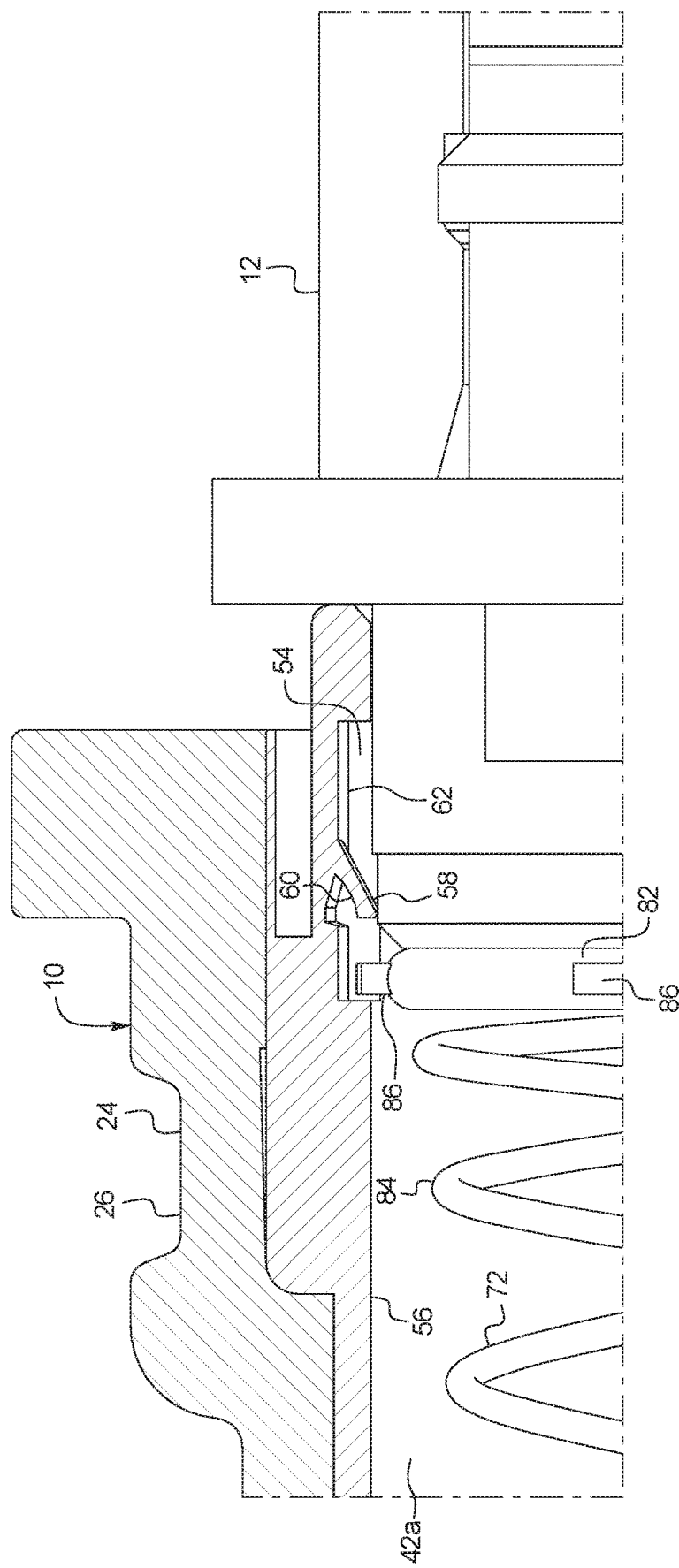
FIG. 9 is an enlarged cross sectional partial view of one passageway of the check valve system of FIG. 2 with the mixer attached.

As the mixer 12 is connected to the check valve system 10, the protrusion 86 on the second end 82 of the biasing member 72 engages the protrusion 58 in the groove 54. Since the protrusion 58 in the groove 54 is angled in a direction away from the dispensing direction (i.e., away from the outlet 32a), the protrusion 86 of the second end 82 of the biasing member 72 is capable of flexing the protrusion 58 in the groove 54 outwardly, enabling the second end of the biasing member 72 to traverse the second portion of the passageway in a direction opposite the dispending direction, as shown in FIG. 9. The protrusion 86 on the second end 82 of the biasing member 72 passes the distal end of the protrusion 58 in the groove 54, and the protrusion 58 in the groove 54 is able to flex back radially inwardly. The protrusion 58 in the groove 54 preferably flexes back radially inwardly to a radial position that is inside the radial position of the protrusion 86 on the second end 82 of the biasing member 72. In other words, the protrusion 86 on the second end 82 of the biasing member 72 has a radius that is greater than the protrusion 58 in the groove 54. Moreover, preferably at least two protrusions 86 are disposed on the second end 82 of the biasing member 72 180° apart and thus define a diameter that is greater that the diameter of the protrusion 58 in the groove 54.

Figure 10:
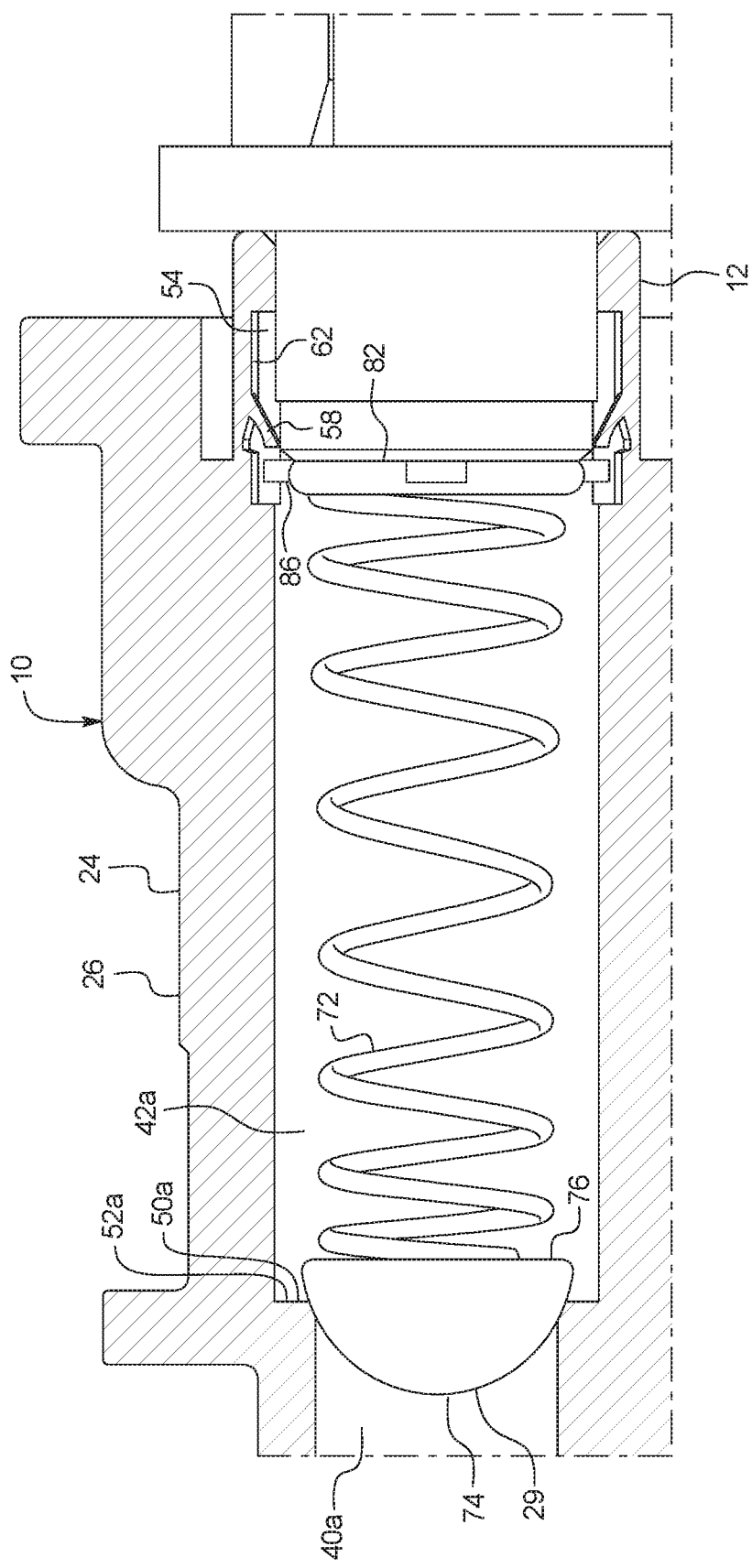
FIG. 10 is an enlarged cross sectional partial view of one passageway of the check valve system of FIG. 2 with the mixer attached and a locking mechanism connecting the mixer and the check valve system.

Accordingly, as shown in FIG. 10, the biasing member 72 is locked into a partially compressed position within the second portion 42a of the first passageway 26. This compressed or stressed position loads the biasing member 72 and causes the biasing member 72 to exert an outward force toward the ends 80, 82 of the biasing member 72. Thus, the first end 80 of the biasing member 72 applies a force to the flat surface 76 of the blocking element 29, which in turns causes the curved surface 74 of the blocking element 29 to engage the ledge 52a between the first portion 40a and the second portion 42a of the first passageway 26. The force is generally sufficient to seal the first passageway 26 and stop material or fluid from passing through the first portion 40a of the first passageway 26 to the second portion 42a of the first passageway 26.

Figure 11:
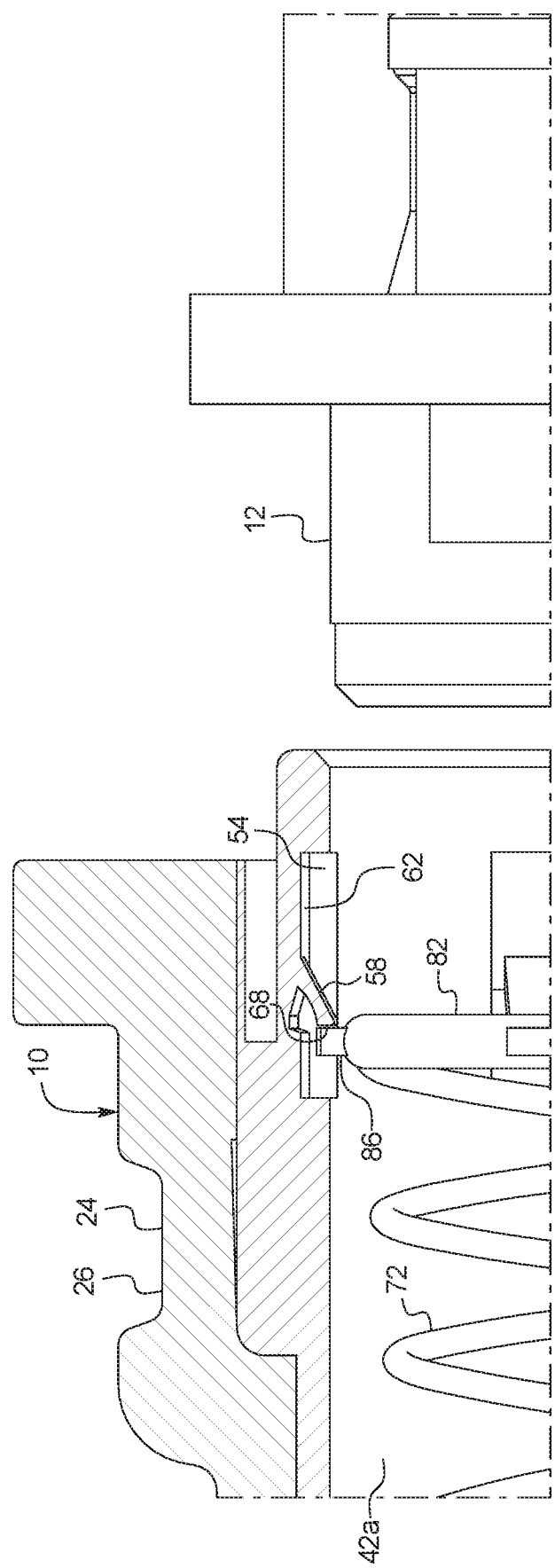
FIG. 11 is an enlarged cross sectional partial view of one passageway of the check valve system of FIG. 2 with the mixer removed or unattached.

Moreover, as shown in FIG. 11, even when the mixer 12 is removed, the biasing member 72 remains in a compressed (or partially compressed) state, since the protrusion 86 on the second end 82 of the biasing member 72 engages the protrusion 58 in the groove 54.

It is noted that any description of the first passageway 26 and the components thereof is applicable to the second passageway 28 and the components thereof.

As can be understood, the blocking elements 29 and 31 seals the first and second passageways 26, 28 from fluids passing therethrough. Thus, when the check valve system 10 is coupled to a storage device S no compounds or fluids can pass through the check valve system 10 and into the mixer 12 until desired.

The biasing members 72 and 73 preferably have a predetermined spring constant that can be overcome with sufficient pressure applied to the compound in the storage device S. In one embodiment, the compound can be urged to move from the storage device S into the check valve system 10 using a plunger system PS. Thus, when the storage device S is coupled to the check valve system 10, as described above, and it is desired to move the compounds from the storage device S to the check valve system 10 and into the mixer 12, pressure is applied to plungers (not shown) through the plunger system PS, which forces the compounds out of the storage device S and into the first portion 40a/40b of the first and second passageways 26, 28. The force of the compound overcomes the spring constant of the biasing members 72 and 73, moving the curved surface 74 of the blocking elements 29 and 31 away from the ledges 52a/52b. The blocking elements 29 and 31 enter an open position and enable the compound to move from the first portion 40a/40b of the first and second passageways 26, 28 to the second portion 42a/42b of the first and second passageways 26, 28. and into the mixer 12.

As can be understood, the dispensing process can be operated in or applied to any suitable process requiring a component(s), such as a process using one, two or more components (materials) for coatings in marine, pipeline, bridge, tank, wind, rail and confined space applications, or any other suitable application.

The check valve system described herein reduces costs and eliminates that need to form the system using multiple molds. Further, a method of efficiently forming a check valve system is provided.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also, as used herein to describe the above embodiments, directional terms such as transverse, as well as any other similar directional terms refer to those directions of the check valve system. Accordingly, these terms, as utilized to describe the present invention should be interpreted relative to the check valve system.

The term "configured" as used herein to describe a component, section or part of a device that includes structure that is constructed to carry out the desired function.

The terms of degree such as "substantially" as used herein mean a reasonable amount of deviation of the modified term such that the end result is not significantly changed. While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A check valve system, comprising:
   a housing having a passageway therethrough, the passageway including a first portion and a second portion and retention clips on an internal surface of the passageway, the first portion having a diameter that is less than a diameter of the second portion so as to form a stepped portion;
   a blocking element disposed within the second portion of the passageway; and
   a biasing member disposed within the second portion of the passageway and configured to maintain the blocking element in contact with the stepped portion when under compression,
   the retention clips configured to retain the biasing member in a partially compressed state, and
   the housing, the blocking element and the biasing member being obtainable by substantially simultaneously 3D printing, so as to be formed from one or more 3D printable materials.

2. The check valve system according to claim 1, wherein the housing, the blocking element and the biasing member are formed from the same material.

3. The check valve system according to claim 1, wherein the biasing member is a spring formed under zero stress.

4. The check valve system according to claim 1, wherein the biasing member is a spring that is configured to be initially compressed when a dispensing device is at least partially disposed in the second portion of the passageway.

5. The check valve system according to claim 4, wherein the biasing member is configured to be compressed when the dispensing device is coupled with the check valve system.

6. The check valve system according to claim 1, wherein the housing, the blocking element and the biasing member are formed from at least one of PA12, polypropylene, and glass filled polyamide.

7. The check valve system according to claim 1, wherein the passageway is a first passageway and the housing includes a second passageway, the blocking element is a first blocking element and a second blocking element is disposed in the second passageway, and the biasing member is a first biasing member and a second biasing member is disposed in the second passageway, the first and second passageways extending in a longitudinal direction.

8. A dispenser for dispensing a compound, the dispenser comprising:
a storage device for the compound;
an outlet for dispensing the compound; and
the check valve system of claim 1 disposed between the storage device and the outlet.

9. The dispenser of claim 8, further comprising
a plunger system to dispense the compound, the force of the compound being pushed through the check valve system causing the blocking element to open.

10. A method comprising:
operating the dispenser of claim 8, in at least one of a marine, a pipeline, a bridge, a tank, wind, rail and a confined space application.

11. A method of forming a check valve system, the method comprising:
substantially simultaneously 3D printing a housing having a passageway therethrough, the passageway including a first portion, a second portion, and retention clips on an internal surface of the passageway, the first portion having a diameter that is less than a diameter of the second portion so as to form a stepped portion, a blocking element disposed within the second portion of the passageway, and a biasing member disposed within the second portion of the passageway and configured to maintain the blocking element in contact with the stepped portion when under compression; and
retaining the biasing member in a partially compressed state with the retention clips.

12. The method according to claim 11, wherein
the biasing member is a spring formed under zero stress.

13. The method according to claim 11, further comprising
initially compressing the biasing member when a dispensing device is at least partially disposed in the second portion of the passageway.

14. The method according to claim 11, further comprising
compressing the biasing member when a dispensing device is coupled to the check valve system.

15. The method according to claim 11, further comprising
forming the housing, the blocking element and the biasing member from at least one of PA12 polypropylene, and glass filled polyamide.

16. The method according to claim 11, wherein
the passageway is a first passageway, the blocking element is a first blocking element, and the biasing member is a first biasing member, and
the substantially simultaneously 3D printing including printing a second passageway, a second blocking element disposed in the second passageway, and a second biasing member disposed in the second passageway, the first and second passageways being substantially parallel to each other.

* * * * *